Figure 1:
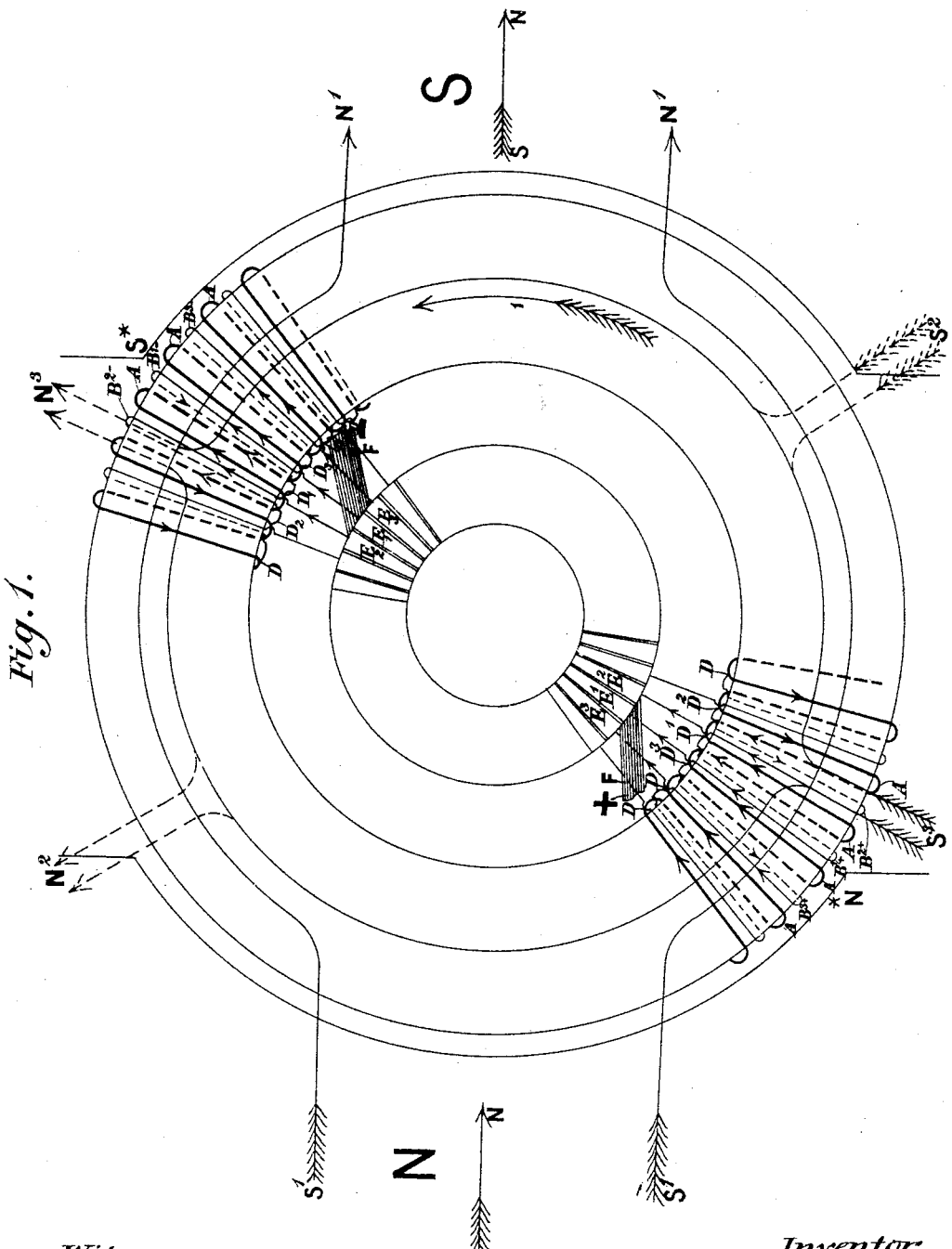

(No Model.) 4 Sheets—Sheet 1.

W. B. SAYERS.
ARMATURE FOR DYNAMO ELECTRIC MACHINES OR MOTORS.

No. 516,553. Patented Mar. 13, 1894.

Witnesses
Inventor

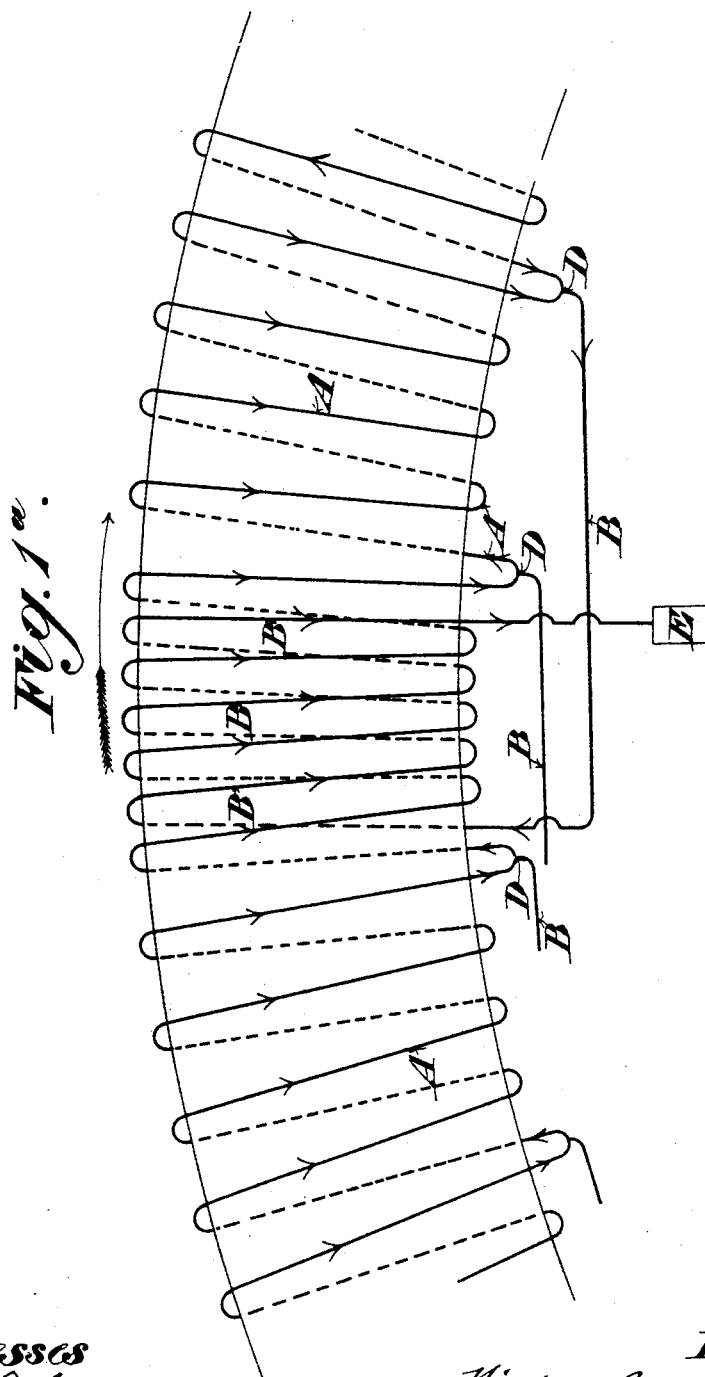

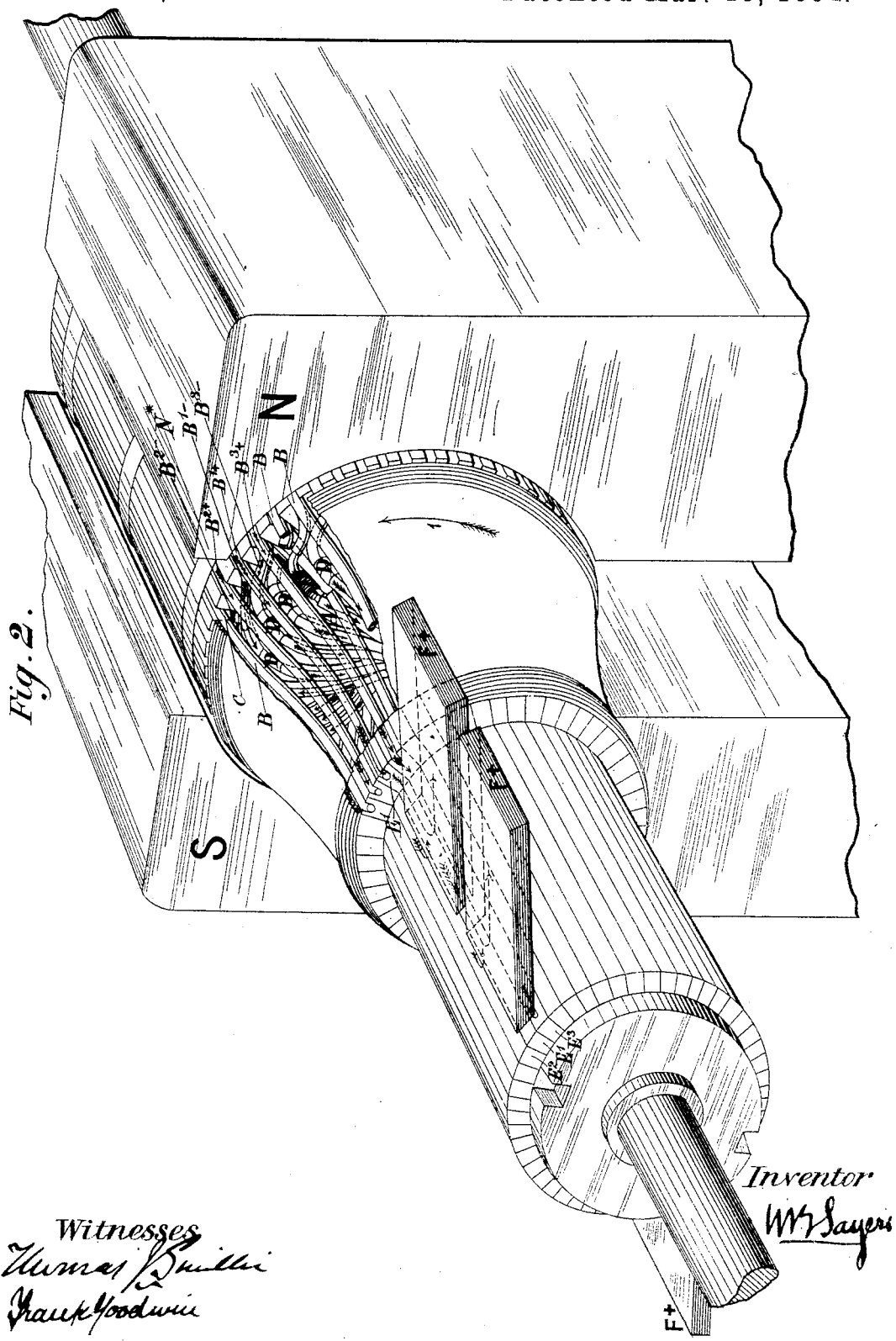

(No Model.) 4 Sheets—Sheet 4.

W. B. SAYERS.
ARMATURE FOR DYNAMO ELECTRIC MACHINES OR MOTORS.

No. 516,553. Patented Mar. 13, 1894.

Witnesses.
Parks R. McBride.
James Austin.

Inventor:
William Brooks Sayers
By Alexander & Davis
Attorneys

UNITED STATES PATENT OFFICE.

WILLIAM BROOKS SAYERS, OF GLENWOOD, BEARSDEN, SCOTLAND.

ARMATURE FOR DYNAMO-ELECTRIC MACHINES OR MOTORS.

SPECIFICATION forming part of Letters Patent No. 516,553, dated March 13, 1894.

Application filed April 26, 1892. Serial No. 430,707. (No model.)

*To all whom it may concern:*

Be it known that I, WILLIAM BROOKS SAYERS, a subject of the Queen of Great Britain and Ireland, residing at Glenwood, Bearsden, near Glasgow, in the county of Dumbarton, Scotland, have invented Improvements in Dynamo-Electric Machines, of which the following is a specification.

This invention has reference to improvements in dynamo electric machines and motors of the kind in which the commutator strips are connected to the sections of the armature winding through commutator coils in which an electro-motive force is set up when the machine is running the object being to obtain a sparkless or nearly sparkless collection at the commutator under conditions where this would not be possible if the ordinary direct method of connection between the armature winding and commutator were adopted, that is to say, where the commutator brushes have a backward lead when running as a generator and a forward lead when running as a motor. For this purpose according to my invention each of the said commutator coils is connected to the armature winding in such a manner that it will have a backward lead with reference to the point between sections of the armature winding to which it is connected, when the machine is running as a generator, and a forward lead when the machine is running as a motor, and the commutator brushes are arranged so as to have a backward lead when the machine is running as a generator and a forward lead when it is running as a motor, the arrangement in each case being such that the armature current will tend to increase the total magnetic flux, and that the resultant electro-motive force induced in any two of the commutator coils and in the section of the armature winding that connects them will reverse or tend to reverse the current in the said section of the armature winding and reduce to zero the current in the commutator coil connected to the commutator strip that is about to leave the commutator brush at the time when one of the said two commutator coils is under one of the horns of the field magnet poles that is strengthened by the armature current and the other has passed from under the same and the two corresponding strips of the commutator are connected by a commutator brush. The commutator coils may be wound over the top or by the side of the armature coils to which they are connected and are led around the circumference of the armature any desired angular distance before being led around the core, and they may be led either a fraction of a turn or any number of turns around the armature core as may be necessary to secure the desired result. In all cases the commutator coils are angularly displaced with reference to the point of connection with the main winding and are so wound upon the armature core that currents in the two sides of the commutator coil and in the respective sections of the armature winding adjacent to them are in the same direction.

My invention may be applied to dynamo electric machines of various types.

Figure 3:
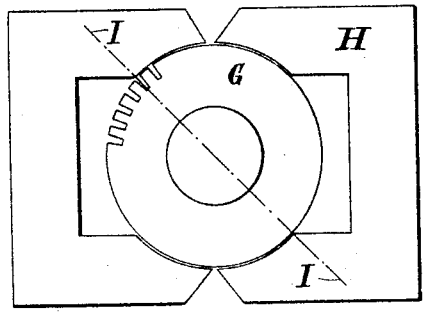
Figure 4:
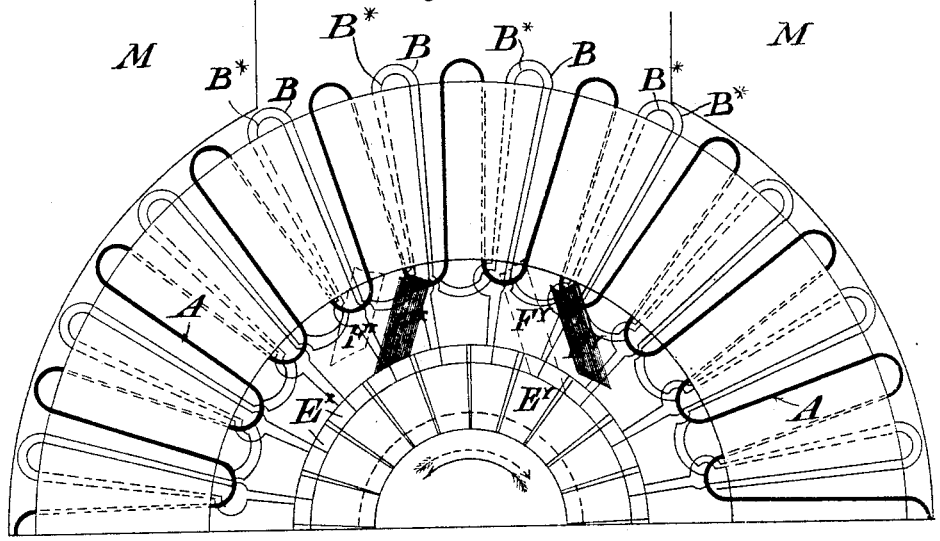

In the accompanying drawings Figure 1 is a diagrammatic view illustrating its application to a dynamo electric machine with ring armature. Figure 1$^a$ is a diagrammatic view illustrating a modified arrangement of commutator coil. Fig. 2 is a perspective view illustrating its application to a dynamo electric machine with drum armature. Fig. 3 is a diagrammatic representation of field magnets and armature for use with my invention when no winding is used upon the field-magnets. Fig. 4 is a diagrammatic view hereinafter referred to.

Referring to Fig. 1, A A is the main armature winding. $B'+ B^2+ B^3+$ and $B'- B^2- B^3-$ are commutation coils according to this invention wound around the armature core. The former set are connected at one of their ends to the armature winding A at the points $D'\ D^2\ D^3$ respectively, and at their other ends to the commutator sections $E'\ E^2\ E^3$ respectively. The latter set of commutator coils are connected at one of their ends to the armature winding at the points $D_1\ D_2\ D_3$ respectively, and at their other ends to the commutator sections $E_1\ E_2\ E_3$ respectively. Each commutator coil is connected to the armature winding at a point in advance of the coil, with reference to direction of rotation of the armature, when running as a generator, or to a point which would be in rear of the coil if the armature should be run in the opposite direction as a motor. Furthermore each commutator coil is doubled back from its point of connection with the armature winding, and wound around the core in the opposite circumferential direction around the core, that is to say when the armature winding is wound so as to form a left handed coil, as in the example shown, each commutator coil may be wound to form a right handed coil. By this means a direct electro-motive force will be produced in each of the commutator coils as it passes under the tips or polar horns $N^* S^*$ at the trailing ends of the field magnet pole pieces N S.

F+ and F− are the commutator brushes.

Assuming that the armature is rotated in the direction of the arrow 1, and is running as a generator then the direction of the current through the armature winding and the respective commutator coils when the same are in the position shown, will be that indicated by the arrows on the said winding and coils, at this time the armature current is mainly passing through the commutator coil $B'+$ to the central commutator section $E'$ under the brush F+ and from the brush F− through the commutator section $E_1$ to the commutator coil $B'-$; the current flowing through the commutator coils $B^2+$ and $B^2-$ in advance of the coils $B'+$ and $B'-$ and which are respectively connected to the commutator sections $E^2$ and $E_2$ that are about to leave the tips of the brushes, is approaching zero under the effect of the greater electro-motive force which is being generated in the commutator coils $B'+$ and $B'-$ in consequence of the latter coils being under the tips $N^* S^*$ of the pole pieces N S; and a current is commencing to flow through the commutator coils $B^3+$ and $B^3-$ connected to the commutator sections $E^3$ and $E_3$ that are just coming under the brushes in consequence of the electro-motive force generated in them being approximately equal to that in the coils $B'+ B'-$ which are carrying the bulk of the current. As the armature advances forward the commutator coils $B'+$ and $B'-$ will leave the tips $N^* S^*$ of the pole pieces N S and the electro-motive force generated in them will rapidly fall in consequence, while the portions of the armature coil which are connected between them and the commutator coils $B^3+ B^3-$ will also be well away from the tips of the pole pieces and will be comparatively inactive. The commutator coils $B^3+$ and $B^3-$ will however be approaching the tips $N^* S^*$ of the pole pieces where the magnetic flux is densest, and as a consequence if the proportions of the armature coils to the commutator coils are correct, the current in the portions of the armature coil A connected between $B'+ B'-$ and $B^3+ B^3-$ respectively will be reversed and that in the commutator coils $B'+ B'-$ will be brought down to zero just as the sections $E' E_1$ to which they are connected are leaving the tips of the commutator brushes and a sparkless break will be the result, although the brushes have the opposite lead to that which is essential in machines wound in the ordinary simple manner, or even having loops upon the armature connecting the commutator to the main winding but which are not wound according to my invention.

The two arrows $N' S'$ passing through the armature indicate the direction of magnetization which would be produced by the field coils alone. The arrows $N^2 S^2$ indicate the direction of magnetization and position of the poles which would be produced by the current in the armature coils if the commutation took place in the ordinary way by brushes having a lead in the direction of rotation. The arrows $N^3 S^3$ indicate the direction and approximate position of poles when the brushes are set with a backward lead and the machine is running as a generator which is rendered practicable by my invention. From this it follows that whereas in the former case the current in the two sections of the armature coils situated for the time being between the pole pieces of the field magnet is opposite to the direction of field excitation; in the latter case the effect of the current flowing through the said two sections or series of armature coils is to aid the field excitation with the result that instead of an increase in the armature current tending to reduce the electro-motive force generated as in the case with simple shunt machines running with a forward lead, in the ordinary manner the armature current tends to increase the magnetic flux and consequently to increase the electro-motive force generated. To secure that increased electro motive force shall be caused by an increase of current in the armature or main circuit in dynamo machines for parallel working, it has hitherto been necessary to resort to compound winding of the field coils. Furthermore as the strength of the trailing corner of the pole piece when running as a generator, or the leading corner when running as a motor, increases with the armature current, the brushes will require little or no adjustment, the electro-motive force required to effect the reversal of the current in the coils during commutation, being automatically increased as required, by the increase in the strength of the said pole piece.

Although in the preceding arrangement, each armature coil is shown doubled back (in the case of a generator) from its point of connection with the armature winding and wound around the armature core in the opposite circumferential direction so as to form a coil of opposite hand to the main winding, the said coils may be otherwise wound provided the current generated in them and in the adjacent sections of the armature winding are in the same direction. Thus if each commutator coil B be doubled back from the said point of connection D as shown diagrammatically in Fig. 1ª which for the sake of clearness shows only one of such coils, and be then wound around the armature core in the same circumferential direction as the armature winding A, and then be connected to a commutation section E as shown, the electrical result is the same as in the preceding arrangement. Again the commutator coils need not be wound along the armature core as in Figs. 1 and 1a. They may be merely displaced in an angular direction with reference to the point of connection with the main winding as in the previous examples and then be wound around the armature core in the same plane as one of the sections of the armature winding as in the arrangement next herein described.

In the arrangement shown in Fig. 2 the main or armature winding A is wound upon the well known Hefner von Alteneck principle, in forty-eight sections of two turns each on an armature core of the drum type. The slots C in this armature core are cut deeply and the first half of the winding wound in the bottom thereof, the second half following next while the commutator coils occupy the upper portions of the slots. A portion of one of the commutator coils B is shown broken away, and a junction, with the insulation stripped off, between the main armature winding and a commutator coil is shown at D*. It will be seen from this figure that each of the commutator coils passes near one end into the slot second removed, in the direction opposite the direction of rotation of the armature, when running as a generator from the slot into which the part of the main winding passes to which it is connected. After traversing the length of the slot, it crosses at the far end to the other side of the armature and returns through the diametrically opposite slot, after which it is connected to the commutator section opposite it. Thus all the visible junctions marked D D belong to the commutator coils that are connected to the commutator sections on the side diametrically opposite to that part where the covering is removed in the drawings, while the commutator coils, the ends of which are seen in the drawings connected into their respective commutator sections, pass around the armature and are joined to the main winding on the opposite side at corresponding points diametrically opposite to the junctions lettered D D. The several commutator coils B' B² B³ which are marked with a minus sign form the commutator connections for the second or top half of the main winding, and those marked with a plus sign form the commutator connections for the first or lower half of the main winding. The points in the main winding from which the current is drawn are approximately on the opposite side of the armature to that on which are the commutator sections to which they are connected through the commutator coils.

The commutator coils and the main winding are wound in the same direction. Thus, assuming the armature winding to have been passed around the armature from left to right on the top and from right to left below and the successive sections of the winding to have been put on in such a manner that each succeeding one is a step farther in the direction in which the armature is represented as moving, then in like manner the commutator coils will be wound from left to right over the top of the armature and from right to left below. The commutator coil B'+ being under the trailing tip or horn N* of the pole piece N, the machine being considered as a generator has an electro-motive force generated in it equal to that generated in one turn of the main winding, and the commutator section connected to it being under the brushes, the main current is drawn through this coil. The path of the current in the commutator coils, commutator sections, and brushes, is indicated by arrows. The coil B'+ has a large arrow drawn upon it to indicate that the main portion of the armature current is passing to the commutator section E' and thence to the brush F+ through this coil. In like manner the coil marked B'− also has a large arrow drawn upon it to indicate that the main portion of the current is passing through it back into the main winding. This arrow is shown divided into two toward the point, to indicate the division of the current into two parts at the junction with the main winding. A small arrow is drawn upon each of the commutator coils marked B²+ B²− B³+ B³−. The small arrows on B²+ and B²− are intended to indicate that the current in these coils is approaching zero in consequence of the action before described, and that by the time the corresponding commutator sections have broken connection with the tips of the brushes, only one pair of which can be clearly seen in Fig. 2, the current in these coils will be just at the zero point, and the break will thus be sparkless. The small arrows on coils B³+ B³− are intended to indicate that a current is just starting in these coils owing to the connection being established between the brushes and the corresponding commutator sections. As the rotation proceeds, the commutator coils marked B'+ B'− will move away from under the magnet pole N, and the electro-motive force generated in them will rapidly fall, consequently the current in B'+ and B'− will diminish, and that in B³+ and B³− will increase at a corresponding rate until when the coils B³+ and B³− have reached the position shown as occupied by the coils B'+ B'−, they will be carrying nearly the whole current, and the coils B'+ and B'− will then have arrived at the positions shown as occupied by the coils B²+ B²− and the current in them will be approaching zero. It will be seen that each of these commutator coils which has passed from under the pole piece, during the time in which the corresponding commutator section is still under the brush is connected in parallel with the adjacent commutator coil which is still under the said pole, the connection between the two being completed through one section of the main winding which is also well out from under the pole piece. The excess electro-motive force in the commutator coil under the pole, over that in the main winding coil and the commutator coil which have passed out from under the said pole, will be sufficient to reverse the current in the main winding and reduce that in the last mentioned commutator coil to zero just as the commutator section connected to this coil leaves the brush, and thus a sparkless break will be secured. A sparkless break will be thus obtained both when the brushes have a backward lead and the machine is running as a generator, and also when the brushes have a forward lead and the machine is running as a motor.

The effect of giving the brushes a backward lead when running as a generator is as hereinbefore stated with reference to Fig. 1, that the portion of the main winding of the armature situate between the field magnet poles, assists the exciting coils of the field magnet by increasing the magnetic flux, with the result that a rise in the electro-motive force generated will take place with an increase in the load put upon the machine—a result hitherto obtained by compound winding of the field magnets. The result of giving the brushes a forward lead when running the machine as a motor, is that the current in the before mentioned portion of the main winding still aids in increasing the effective magnetic flux thereby producing greater stability of the magnetic field, and also an increased torque with an increased load.

The density of the magnetic flux under the tip or horn of the magnetic pole marked $N^*$ (Figs. 1 and 2) will be increased when the armature current is increased, owing to the well known effect of the current in the armature winding. The result will be to make the commutator coils more active. A greater electro-motive force will consequently be generated in the one for the time being, under the pole tip $N^*$ and a greater excess of electro-motive force will consequently be produced over that generated in the section of the main winding in which the current is required to be reversed and in the commutator coil which has moved away from the pole, than would be the case with less current. Thus as a greater electro-motive force is required to reverse the greater current in the armature sections, the required conditions are produced nearly or quite automatically, that is to say, little or no shifting of the brushes with varying current, will be required. This more or less perfect automatic action is most pronounced with dynamo machines having toothed or slotted armatures and short air spaces, and this invention is of special value for such machines, as by its use, these machines can be made to run sparklessly even though the air space be made very short, and when this is done, shorter and consequently lighter field magnets and less exciting force suffices, so much so that by means of my invention I can when desirable entirely dispense with winding upon the field magnets, in which cases I may make the field magnet poles to embrace a considerably smaller portion of the armature than is usual.

Fig. 3 is a diagrammatic representation of field magnets and armature designed to work without winding upon the field magnets. G is the armature core. H, H, are the magnets. It will be seen that if the machine is constructed according to my invention, as hereinbefore described, to run with a backward lead when running as a generator, or a forward lead when running as a motor, the commutator brushes being set approximately on the line I, I, a considerable portion of the armature winding will tend directly to produce the required magnetic flux through the said armature, and also through the field magnets.

The lengths of wire which are to form the commutator coils may be connected to the main armature winding as the winding operation proceeds. The ends of the said lengths may be either coiled up to keep them out of the way until the main winding is finished after which they can be wound into their respective positions over the main winding; or the said lengths of wire may be wound as soon as convenient into their proper places either above, below, or in between the main winding wire or wires.

I have found it convenient to join short lengths of insulated preferably flexible conductor at convenient points between the sections of the main winding during the winding operation and then to put on the commutator coils leaving the ends free. The commutator coils can then be connected to the flexible ends after the winding is completed. The amount of lead of the commutator coils as compared with the main winding sections to which they are connected, can then be readily altered if desired.

It is to be understood that this invention is not limited to the arrangement of the commutator coils either for running a generator with a backward lead, or a motor with a forward lead. The commutator coils can be arranged so as to secure diminished sparking at the brushes both when running with a forward lead in the case of a generator, and with a backward lead in the case of a motor.

When the dynamo or motor is required to run in either direction at will, and the commutator coils have a lead relatively to the armature coils as hereinbefore mentioned, I may employ two independent commutators and two sets of commutator coils and give the set of commutator coils connected with one commutator a lead in one direction and those connected with the other commutator an equal lead in the opposite direction. One commutator will then be used when the machine is running in one direction, and the other when the machine is running in the opposite direction, the brushes being lifted off the commutator which is not in use. Fig. 4 is a diagrammatic view illustrating this construction as applied to a machine having a Gramme armature and intended to run as a motor with forward lead. A is a main armature winding. B B are the commutator coils of one set; they are connected as before to the armature winding and to the respective strips of the commutator $E^x$ which will be in use when the machine is running in the direction of the arrow shown in full lines. $B^* B^*$ are the commutator coils of the other set, connected to the armature winding and to the respective strips of the commutator $E^y$ which will be in use when the machine is running in the opposite direction and which will be fixed on the armature shaft at the end of the armature opposite to that at which the commutator $E^x$ will be located. $F^x$ is one of the brushes for the commutator $E^x$, and $F^y$ is one of the brushes for the commutator $E^y$. M M are the field magnet poles. When the machine is to run in the direction of the full arrow, the brushes $F^x$ and $F^y$ must be moved into the positions shown in full lines so that the brushes $F^x$ and commutator $E^x$ will alone be operative. When the machine is to run in the direction of the dotted arrow, the brushes $F^x$ and $F^y$ must be moved into the positions shown in dotted lines so that the brushes $F^y$ and commutator $E^y$ will then be alone in use.

What I claim is—

1. In a dynamo-electric machine, an armature having the sections of its winding connected to the commutator strips by commutator coils so wound upon the armature core that the current generated in each of them and in the adjacent armature section will be in the same direction substantially as herein described.

2. In a dynamo electric machine, an armature having the sections of its winding connected to the commutator strips by commutator coils angularly displaced with reference to the point of connection with the main winding and so wound upon the armature core that the currents generated in them and in the adjacent sections of the armature winding will be in the same direction substantially as herein described.

3. A dynamo-electric machine, in which the sections of the armature winding are connected to the commutator strips through commutator coils, each of said commutator coils being wound so as to have, with reference to its point of connection with said armature winding, a backward lead when the machine is running in one direction as a generator and a forward lead when the machine is running in the opposite direction as a motor and so that a direct electro-motive force will be generated in it when passing under the polar horns of the field magnet that are strengthened by the armature current substantially as herein described.

4. In a dynamo electric machine, an armature having the sections of its winding connected to the commutator strips by commutator coils wound upon the armature core so that the currents generated in them and in the adjacent sections of the armature winding will be in the same direction, and commutator brushes arranged to bear upon said commutator strips so as to have a backward lead when the machine is running as a generator and a forward lead when it is running as a motor substantially as herein described for the purpose specified.

5. In a dynamo electric machine, the combination with the sections of the armature winding and the commutator strips, of commutator coils connecting the said sections and strips and each of which is angularly displaced with reference to its point of connection with the main winding and so wound upon the armature core that the current generated in it and in the adjacent section of the armature winding will be in the same direction, and commutator brushes arranged to have a backward lead when running as a generator and a forward lead when running as a motor substantially as herein described.

6. In a dynamo-electric machine, an armature having two independent commutators and two sets of commutator coils connecting the armature winding to the coummtator strips, the one set of commutator coils that are connected to one commutator, having a lead in one direction with reference to the points of the armature winding to which they are connected, and the other set of commutator coils that are connected to the other commutator having a lead in the opposite direction, and two pairs of commutator brushes adapted to be brought alternately into contact with their respective commutators substantially as herein described for the purpose specified.

In testimony whereof I have signed my name to this specification in the presence of two subscribing witnesses.

WILLIAM BROOKS SAYERS.

Witnesses:
THOMAS J. SMILLIE,
*Of 141 West George St., Glasgow, Solicitor.*
FRANK GOODWIN,
*Of 141 West George St., Glasgow, Clerk at Law.*